Figure 1:
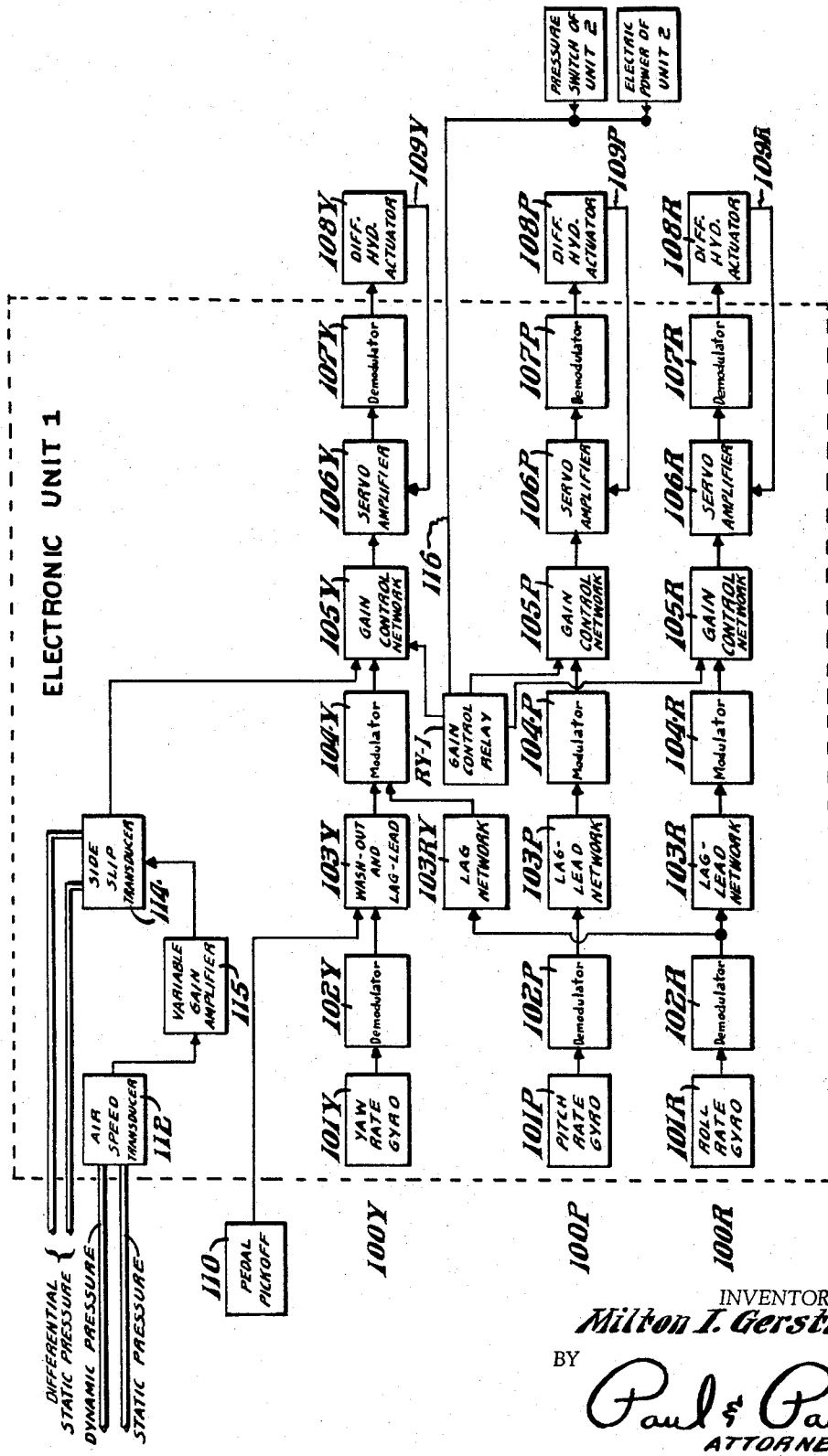

Oct. 8, 1968  M. I. GERSTINE  3,404,856
AUTOMATIC STABILIZATION OF AIRCRAFT
Filed Nov. 14, 1961  6 Sheets-Sheet 6

INVENTOR.
Milton I. Gerstine,
BY
Paul & Paul
ATTORNEYS.

United States Patent Office 3,404,856
Patented Oct. 8, 1968

3,404,856
AUTOMATIC STABILIZATION OF AIRCRAFT
Milton I. Gerstine, Ardentown, Del., assignor to the Boeing Company, Seattle, Wash., a corporation of Delaware
Filed Nov. 14, 1961, Ser. No. 152,188
18 Claims. (Cl. 244—77)

This invention relates to means for automatically stabilizing an aircraft, particularly a VTO (vertical takeoff) type of aircraft. For convenience, the aircraft to be stabilized will be referred to throughout the specification as a helicopter.

It should be pointed out that the automatic stabilization system of the present invention is not an auto-pilot type of system. As is known, an auto-pilot is an aid designed to hold the aircraft at a pre-selected attitude and altitude and on a fixed course until a change is made by the pilot.

In contrast to an auto-pilot system, the automatic stabilization system of the present invention is a simpler less-cosly system intended merely to improve the stability of the helicopter. Moreover, it is designed to provide stabilization of the craft without the pilot being aware that his control linkage is being altered.

As is known, a helicopter has inherent dynamic instability and, in the absence of some form of stabilization system, it is not feasible for the pilot to fly a helicopter "hands off" for more than a few seconds, at least not in rough air. This inability to fly "hands off" restricts the pilot's ability to perform such other functions as navigation and observation. The stabilization provided by the system of the present invention allows the pilot of a helicopter, if he so desires, to fly "hands off" for several minutes at a time and to make well-coordinated "stick" turns over a wide range of forward speeds.

Any automatic stabilization means for a helicopter should meet certain minimum requirements. In the first place, it should be operative throughout the speed range of the craft, all the way from hovering to maximum speed. It should also be operative under all conditions of power, ranging from zero to maximum power, so as to enable the craft to climb or to auto-rotate on instruments as well as to fly level on instruments. The automatic stabilization system must also be capable of producing dynamic stability about all three of the axes, i.e., about the roll axis, the pitch axis, and the yaw axis. The system must be also capable of producing dynamic stability for all weights and for all center-of-gravity conditions of the craft. It must not produce sluggishness in the pilot's control system, nor must it ever put the craft in a dangerous attitude. Lastly, the automatic stabilization system must be reliable.

The automatic stabilization system described in this specification meets the foregoing requirements. The system described and claimed is particularly directed to the requirement of reliability. The system features a dual-unit automatic stabilization system in which each of two similar units normally contributes to the stabilization of the helicopter. However, in the event of failure of either one of the dual units, due to failure of either electrical power or hydraulic pressure, the system is designed to sense such failure and to modify the other dual unit so that it delivers substantially twice as much motion as it delivers when both of the dual units are functioning.

The principal object then of the present invention is to provide a highly reliable automatic stabilization system for a helicopter or other aircraft which does not affect adversely the pilot's control of the craft.

A more specific object is to provide, for a helicopter, an automatic stabilization system which has dual units each of which normally contributes to the automatic stabilization of the craft but in which means are provided for sensing a failure of one of the dual units and effective in response to the sensing of such failure for so modifying the other unit that such other unit delivers an actuation to the rotor controls equivalent to that supplied when both units are functioning.

A still more specific object is to provide a dual automatic stabilization system as above in which the sensing means is effective to detect a failure of the hydraulic pressure or the alternating-current power or the direct-current power.

The foregoing objects are achieved, in accordance with the present invention, by providing dual units each of which comprises, for each axis, a sensor and a differential hydraulic actuator. Each sensor detects the helicopter motion about its particular axis and feeds a corrective signal into the associated differential hydraulic actuator. The differential hydraulic actuator is so connected in the control linkage, between the cockpit controls and the rotor controls, that the controls at the rotor heads are moved by the corrective signal without any motion of the cockpit controls. Each differential hydraulic actuator includes a limited-authority device for limiting the movement of the control linkage in response to the corrective signal. The limited-authority device for each axis may be adjusted differently, but may usually be set to prevent the stabilization system from moving the control linkage by more than approximately 25–30% of its maximum movement. A limited movement of this scope has been found to be ample for stabilization purposes and has the advantage that if a malfunction should occur in the stabilization system resulting in a hard-over signal, a large sudden motion of the craft would be avoided. Moreover, the stops for the linkage system are on the output side of the stabilization actuators so that in the event of a hard-over signal the pilot nevertheless has available his full normal control plus a sufficient over-travel to counteract the full stabilization signal.

In the stabilization system described herein, the sensor for detecting the helicopter motion is a rate gyro, a separate rate gyro being provided for each of the three axes. The rate gyros shown and described herein are electrically driven.

A rate gyro is a known form of precision instrument adapted to measure rate of turn by means of gyroscopic action. It is adapted to be used where control of rate of rotational motion is required. In the particular stabilization system being described, the rate gyro is used to derive information about rates of turn in the pitch, roll and yaw axes of the aircraft. Such information is then used by the system described to control or stabilize the motion sensed. As is well-known, a rate gyro has a spin axis, an input axis, and an output axis, each mutually perpendicular to the others. With no rate of turn applied about the input axis, the rate gyro gives no output, but when an angular rate of motion occurs about the input axis of the gyro, an output signal is obtained. For a constant rate of input motion, a constant output signal is attained. When the rate of turn about the input axis varies, the output signal varies linearly therewith. Thus, when the rate of turn about the input axis is maximum, the output of the rate gyro is maximum.

A rate gyro suitable for use in the automatic stabilization system described herein is produced by U.S. Time Corporation, New York, N. Y., Model 204–040. Other models of rate gyro are produced, for example, by Lear, Inc., Grand Rapids, Mich., and may be used as desired.

Figure 5:
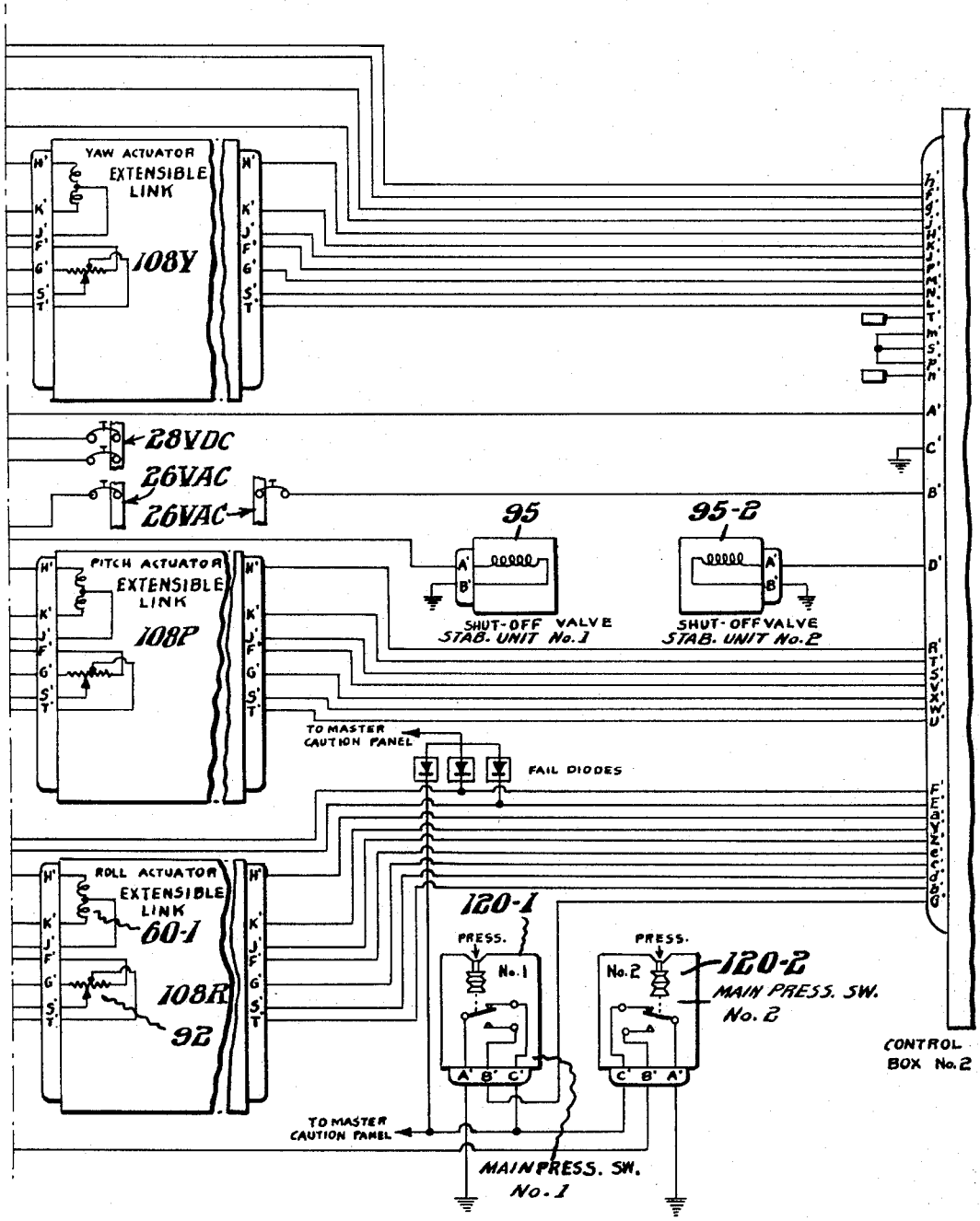

The invention will be best understood from a consideration of the following detailed description of a preferred embodiment of the invention selected for illustration in the drawing in which:

FIG. 1 is a block diagram illustrating one of the dual units of the automatic stabilization system of the present invention;

FIGS. 2–5, in that order from left to right, together comprise a composite schematic showing the details of the electronic circuitry of the dual unit shown in block diagram in FIG. 1;

FIG. 5 also shows the second unit electrically connected to the first unit; and

Figure 6:
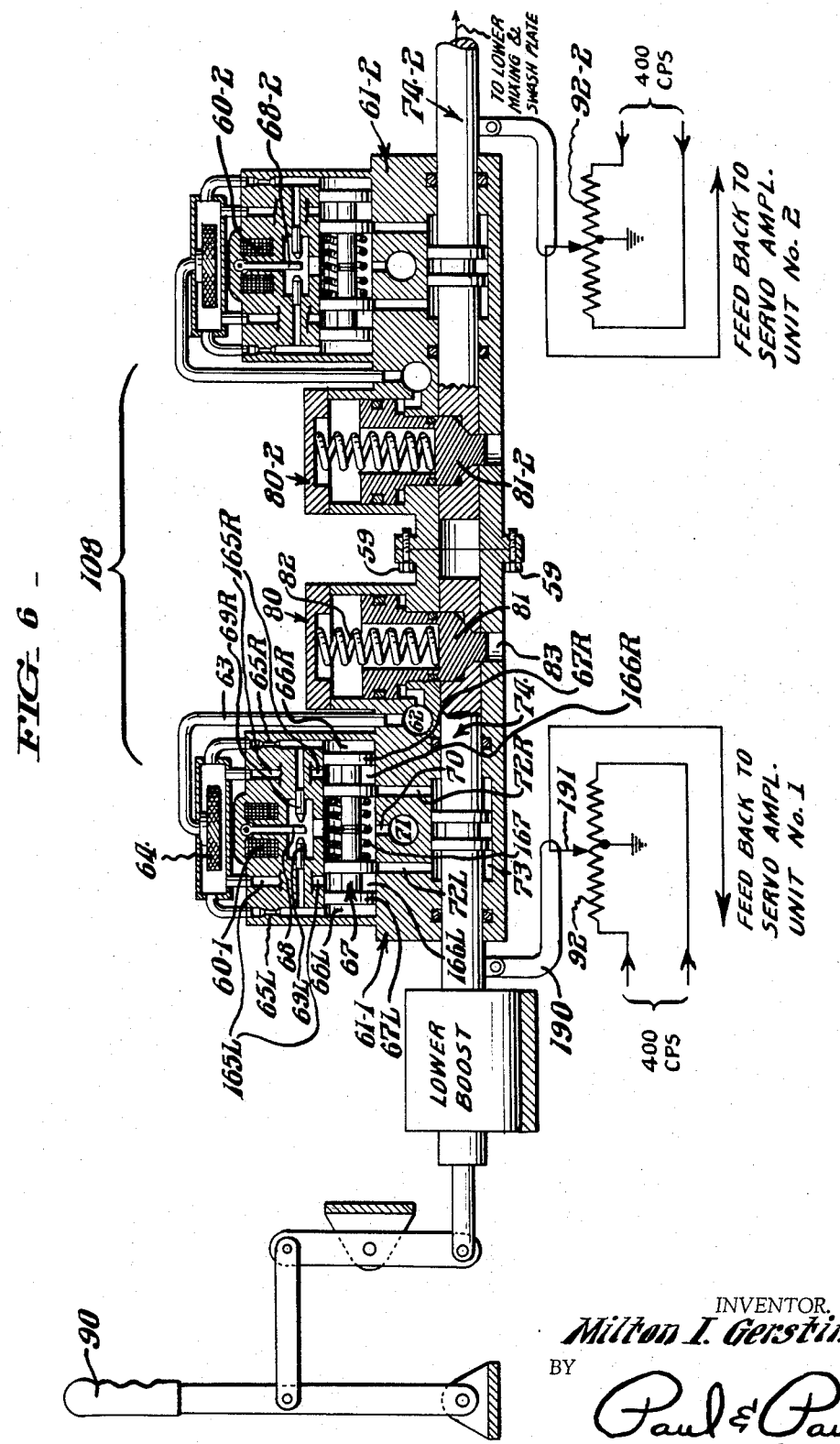

FIG. 6 is a diagrammatic illustration of one of the differential hydraulic actuators. The actuator shown comprises two units, one for each of the dual units. A separate actuator of the type shown in FIG. 6 is provided for each of the three axes.

In describing the preferred embodiment of the invention illustrated in the drawing, specific terminology has been resorted to for the sake of clarity. However, it is not the intention to be limited to the specific terms so selected, and it is to be understood that each specific term includes all technical equivalents which operate in a similar manner to accomplish a similar purpose.

As indicated above, FIG. 1 shows in block diagram form Unit 1 which is one of the units of the two-unit dual system employed in accordance with the present invention. It will be seen that the unit comprises three separate axes channels 100R, 100P, and 100Y—one for each of the three axes, roll, pitch, and yaw. Each axis channel is generally similar to the others and, for ease of reference, the axis channels and the components comprising each axis channel are identified by similar numerals followed by a letter suffix, R, P or Y, according to whether the component is in the roll (R), pitch (P), or yaw (Y) axis channel.

As viewed from left to right in FIG. 1, each axis channel comprises a rate gyro 101, a demodulator 102, a frequency-selective network 103, a modulator 104, a gain-control 105, a servo amplifier 106, a demodulator 107 and a differential hydraulic actuator 108, coupled together in that order.

In each axis channel, negative feedback is provided from the output of the differential hydraulic actuator 108 to the input of the amplifier 106 by way of feedback lead 109. A connection 116 extends from a hydraulic pressure switch of Unit 2 and also from the electrical circuits of Unit 2 to a gain-control relay RY–1 for controlling the gain-control networks 105 in each axis channel.

An inter-channel connection between the roll and yaw axes channels is made from the output of the demodulator 102R to the input of modulator 104Y through a frequency-selective network 103RY. A rudder pedal pick-off 110 is also shown connected to the input of the frequency-selective network 103Y of the yaw axis channel. An airspeed transducer 112 and a sideslip transducer 114 are provided for feeding a signal from the sideslip transducer 114 to the input of the amplifier 106Y of the yaw axis channel.

The operation of the unit shown in block diagram in FIG. 1 will now be briefly described, after which a more detailed description of the circuitry and its operation will be given.

The rate gyros 101R, 101P, and 101Y are adapted to deliver output signals at the selected alternating-current frequency of the system, which is preferably about 400 c.p.s. (cycles per second). The 400 c.p.s. output signal delivered by the rate gyro varies in amplitude according to the rate of turn of the helicopter about the particular axis. If there is no rate of turn, there is no output.

Considering first the roll-axis channel, the roll rate signal from the roll rate gyro 101R is applied to demodulator 102R and the detected or demodulated output signal is applied to the frequency-selective lag-lead network 103R and also to the inter-channel frequency-selective lag network 103RY leading to the yaw-axis channel. In network 103R, the higher frequencies of the modulation signal are attenuated substantially while the lower frequencies are passed without substantial attenuation. Such higher modulation frequencies may, for example, be the result of helicopter vibration which is well within tolerance and which the stabilization system being described is not designed to correct. The output of the lag-lead network 103R is employed to produce a modulated 400 c.p.s. wave in a chopper circuit in modulator 104R. The modulated output of modulator 104R is passed through a gain-control 105R and is then amplified in amplifier 106R. The amplified signal is then demodulated in 107R and the detected or demodulated signal is applied in push-pull to the center-tapped winding of a torque motor included in the differential hydraulic actuator 108R.

The provision of gain-control relay RY–1 and network 105R (also gain-control networks 105P and 105Y) is in accordance with the teaching of the present invention and provides automatically substantially increased gain in the event of failure of hydraulic pressure or electrical power in the other of the dual units.

The differential hydraulic actuator 108R may be of a type shown diagrammatically in FIG. 6, and later described in detail. The differential hydraulic actuator 108R is effective to extend or to contract the linkage which connects the roll-axis cockpit control to the rotor control, without movement of the cockpit control. Thus, correction is made by the differential hydraulic actuator 108R to the rotor control of the helicopter, and the roll motion sensed by the roll rate gyro 101R is corrected or stabilized. To avoid overcorrecting, a servo loop is employed to provide negative feedback to amplifier 106R. Movement of the differential hydraulic actuator 108R moves a potentiometer wiper arm which controls the feedback by way of lead 109R of a 180° out-of-phase signal to the input of amplifier 106R.

The pitch-axis channel 100P is substantially identical to the roll-axis channel 100R with the exception that there is no inter-channel connection from the pitch to the yaw-axis channel.

The yaw-axis channel 100Y is similar to the other two channels with respect to the components described above. However, the frequency-selective network 103Y, in addition to having a lag-lead feature for shaping the wave, is designed to block or "wash out" the slow variations, i.e., the low-frequency modulations. The purpose of "washing-out" the slow variations is to avoid having the yaw-axis stabilization signal oppose an intentional turn of the aircraft by the pilot. The "wash-out" portion of the network 103Y includes a series capacitor of substantial size. Thus, this portion of the network has a substantial time constant and an initially applied signal such as would occur during entry into a turn would pass through. In the system shown in FIG. 1 and now being described such signal is cancelled out by a signal from the roll-axis channel applied to the modulator 104Y through the lag network 103RY. To restate what has just been said, the "wash-out" feature of the frequency-selective network 103Y in the yaw-axis channel is intended to prevent the differential hydraulic actuator of the yaw-axis channel from opposing the pilot when he makes a turn in flight. Due to the time constant of the "wash-out" circuit, the initially applied signal does pass through the network, and unless cancelled would tend to oppose the pilot when he makes a turn in flight. However, when a pilot makes a turn in flight he always rolls the craft. Thus, a roll-rate gyro signal is bound to be present in the roll axis channel 100R and such signal is applied through the lag network 103RY to cancel out the initially applied yaw-rate signal which passes through network 103Y in the initial period during which the blocking capacitor of the "wash-out" network is charging up. Stated more generally, a lagged roll rate signal from roll axis channel 100R is used to cancel out any yaw rate signal which passes through the "wash-out" network during turn entry so that turns may be well coordinated. Cancellation lasts only during entry into the turn. Thereafter, the yaw rate gyro signal is blocked or "washed out" by the network 103Y, thereby eliminating from the differential hydraulic actuator 108Y any steady state yaw rate gyro signal.

The third signal fed to the yaw axis channel is that relating to sideslip of the helicopter. Sideslip is detected by a differential pressure transducer 114 which is fed by a pair of static air-pressure ports symmetrically placed on the nose of the aircraft. In order to achieve optimum stability at all air speeds, the gain of the sideslip transducer 114 is varied as a function of air speed. This is accomplished by the provision of an air-speed transducer 112 fed by dynamic and static pressure ports placed in the region of the nose of the aircraft. The signal output of the air-speed transducer 112 is applied through a variable-gain amplifier 115 to the sideslip transducer 114 to vary its gain. The output of sideslip transducer 112 is applied to the input of amplifier 106Y through the gain-control circuit 105Y.

The sideslip transducer 114 and the air-speed transducer 112 are pressure transducers of a known type available commercially. For example, pressure transducers manufactured and sold by Ultradyne, Inc., Albuquerque, N. Mex., Model S–40RP±0.5–D are suitable.

The fourth signal applied to the yaw-axis channel 100Y is that obtained from the rudder pedal pickoff 110. This signal is obtained from a pedal-position potentiometer and is used to cancel the yaw rate gyro signal when making turns during hover. During such maneuver, the pilot yaws the craft without roll. Thus, no signal is available from the roll rate gyro through network 103RY and, accordingly, a signal from the rudder pedal is used to cancel out the yaw rate gyro signal.

Having described briefly the automatic stabilization unit shown in block diagram in FIG. 1, attention is now invited to the detailed circuitry shown schematically in FIGS. 2–5, which in order from left to right together form a composite schematic drawing. The roll-axis channel and the pitch-axis channel are similar and do not include several features which are incorporated into the yaw-axis channel. Thus, the detailed description of the roll-axis and pitch-axis channels will be somewhat less complex than that of the yaw-axis channel, and, therefore, it will facilitate the description to describe the roll-axis and pitch-axis channels first.

Referring now to FIGS. 2–5 and to the roll-axis channel 100R shown in detail therein, the rotor of the roll-rate gyro 101R is driven electrically by a 400 c.p.s. alternating current applied to its three windings. As a result, the rotor of the gyro spins at a speed which, for example, may be 24,000 r.p.m. A 400 c.p.s. reference signal is applied across winding A of the inductive pick-off of the roll rate gyro and the signal caused by the rate of turn of the roll rate gyro about its input axis is picked off at point B. This signal is applied to the input windings of transformers T1 and T3 of the demodulator 102R. The 400 c.p.s. reference signal flows through the input winding of transformer T2, and a demodulated output signal is developed at point C, the polarity of which is dependent upon the direction of the rate of turn of the roll rate gyro. The demodulated signal derived at point C is applied to the input of the frequency-selective lag-lead network 103R at point D. The shaped output signal of network 103R appears at point E and this signal is applied to the input winding of transformer T5 of modulator 104R (point G).

Modulator 104R includes a chopper circuit which drops point F to ground potential at a 400 c.p.s. rate due to the 400 c.p.s. reference current which is passed through the input winding of transformer T4. During alternative halves of each cycle, point F is raised to the potential of point G and at these times no current passes through the input winding of transformer T5. The output of the transformer T5 is, therefore, a 400 cycle signal wave modulated by the signal which is delivered to point G from the lag-lead network 103R.

Figure 3:
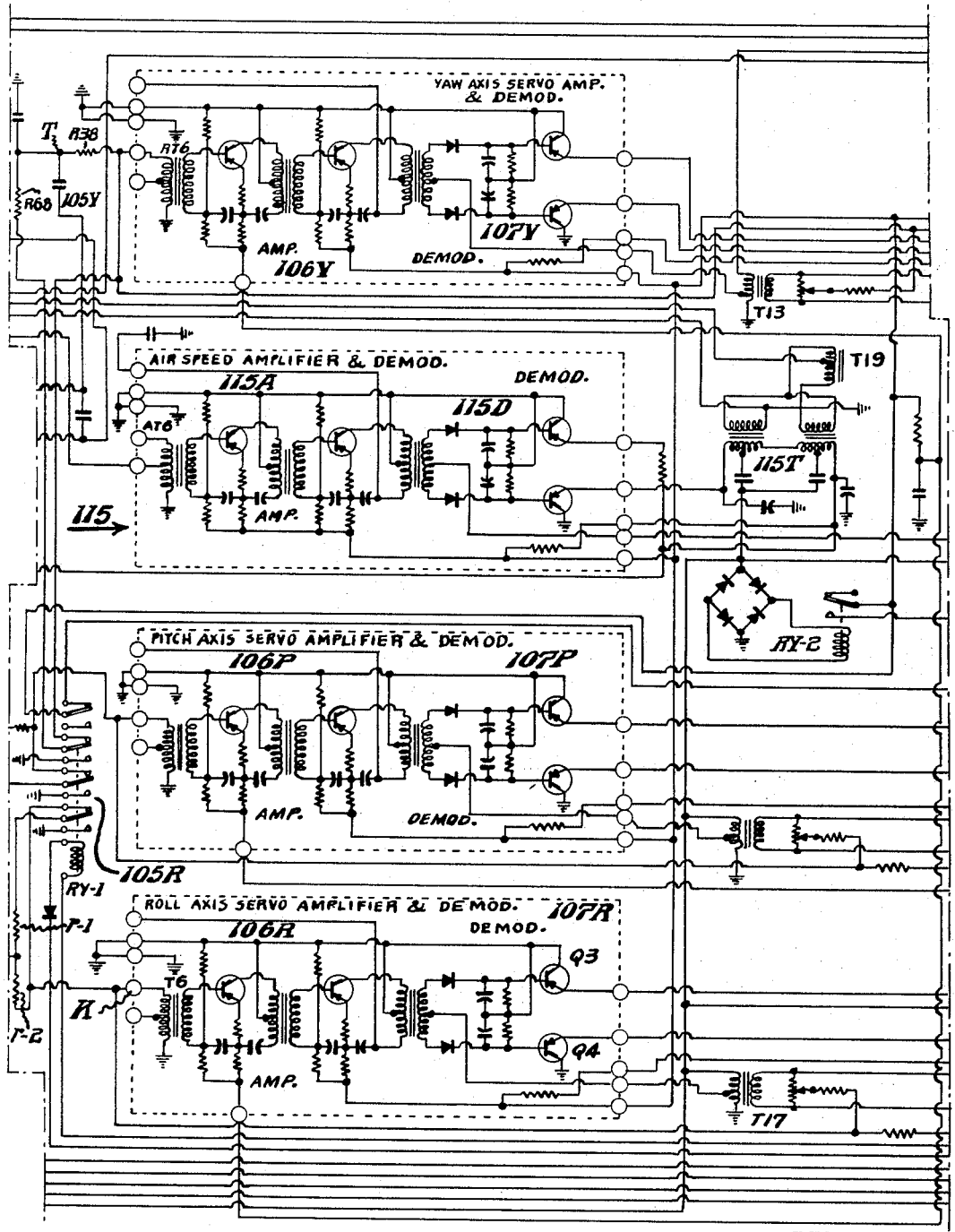

The modulated output signal of transformer T5 is taken off at point H and applied to the gain-control circuit 105R (FIG. 3). Gain-control circuit 105R includes a multiple-contact switch and a coil RY–1 for controlling the positions of the switch arms. In the condition shown in the drawing, the coil RY–1 is assumed to be in de-energized state, and each of the switch arms is in its UP position. With the switch arms in the UP position, the full gain of the control circuit 105R is applied to point K, i.e., to the input winding of transformer T6 of the roll-axis servo amplifier 106R.

It may be pointed out here that the full gain condition illustrated in the drawing is the condition which exists in Unit 1 when there has been either a failure of A-C or D-C power in the other of the dual units, Unit 2, or a loss of pressure in the hydraulic system which supplies the hydraulic actuator of Unit 2. When such a pressure loss or power failure occurs, the D-C circuit through the coil RY–1 is opened, the coil RY–1 is de-energized, and the switch arms go to their UP positions, as illustrated in the drawing. When, as is normal, the other of the dual units (Unit 2) is functioning, and fluid pressure and electrical power are present therein, the circuit through coil RY–1 is maintained closed and the switch arms are pulled to their DOWN positions. In the DOWN positions, the signal current flowing to the right from point H divides equally between resistors $r$–1 and $r$–2, half of the total current flowing to point K and the other half flowing to ground.

It will be seen then that the signal applied to the input of the roll-axis servo amplifier 106R is either at half value or at full value, depending upon whether the other of the dual units (Unit 2) is functioning or disabled, respectively.

The roll-axis servo amplifier 106R is shown as a transistorized amplifier the output of which is applied through demodulator 107R in push-pull manner to the bases of transistors Q3 and Q4. The outputs of transistors Q3 and Q4 are applied to opposite ends of the center-tapped winding (FIG. 5) of the torque motor 60–1 (which is shown in the diagrammatic representation of the differential hydraulic actuator in FIG. 6). The center tap of the winding is returned to a source of direct-current voltage. When no signal is derived from the roll rate gyro 101R the currents to the two sections of the center-tapped winding of the torque motor are equal, and the net torque developed is zero. When, however, a roll rate signal is derived from the roll rate gyro, the transistors Q3 and Q4 of demodulator 107R no longer have equal D-C voltages applied to their bases, and the current which flows through one section of the center-tapped winding of the torque motor 60–1 is greater than that through the other. Accordingly, torque is developed in the torque motor 60–1 the direction of which is dependent upon the direction of the rate of turn of the aircraft about the roll axis.

Referring now to FIG. 6, there is shown a pair of differential hydraulic actuators 108, one of which is associated with one of the electronic units of the dual control system and the other of which is associated with the other of the electronic units. It will be assumed, merely for purposes of facilitating the description, that the actuator shown on the left in FIG. 6 is associated with the electronic Unit 1 illustrated in FIGS. 2–5, and described in part hereinabove. A separate pair of differential hydraulic actuators 108, such as illustrated in FIG. 6, is employed for each of the three axes. It will also be assumed for the purpose of the present description that the pair of actuators shown in FIG. 6 is associated with the roll axis now being described.

Each one of the pair of hydraulic actuators shown in FIG. 6 is substantially identical. However, the two actuators are arranged in complementing fashion, with their respective housings 61–1 and 61–2 bolted together, as by bolts 59. To facilitate the description, only the operation of the actuator shown on the left in FIG. 6 will be described in detail. Fluid pressure is applied at input port 62 and flows through piping 63 and filter screen 64. Restricted fluid pressure flows through restrictive orifices 65L and 65R, one on each side of the unit, and into end chambers 66L and 66R one at each end of the spool 67. Full fluid pressure flows from filter screen 64 down through passages 165L and 165R and into spool chambers 166L and 166R between the lands. Spool 67 actually comprises two separate spools 67L and 67R held together by the fluid pressure in end chambers 66L and 66R against the action of spring 167. The purpose of this arrangement will be explained later. For convenience of description, the two spools 67L and 67R will at times be referred to merely as spool 67.

In FIG. 6, spool 67 is shown in its center position. This is the position which the spool 67 occupies when the currents through the two sections of the center-tapped winding of the torque motor 60–1 are equal. Under these conditions, no torque is developed and the flapper valve 68 is in the center position, as shown in FIG. 6. Neither of the nozzles 69L or 69R is then blocked and hydraulic fluid flows out of both nozzles, returning to the reservoir through passage 70 and exhaust port 71.

With spool 67 in its center position, both of the ports 72L and 72R leading from the spool chamber to the piston chamber 73 are blocked by the spool lands and no pressure is applied to piston 74.

When, however, as a result of a signal from the roll rate gyro, the currents through the two sections of the winding of torque motor 60–1 are no longer equal, torque is developed and the flapper valve 68 is moved either to the left or to the right. In so doing, the flapper valve 68 blocks, or at least substantially restricts, the flow of fluid out of one of the nozzles 69L or 69R.

For purposes of discussion, assume that the flapper valve 68 is moved by torque motor 60–1 to the right, as viewed in FIG. 6. When this occurs, the pressure on the right side of the hydraulic actuator increases, the restricted pressure in end chamber 66R increases and the spool 67 moves to the left sufficient to open ports 72L and 72R without blocking passage 165R. The full pressure in passage 165R is applied to the piston 74 forcing piston 74 to the left and exhausting fluid out of port 72L, through the passage 70, and out of exhaust port 71. There is a mechanical connection (not shown in FIG. 6 to avoid confusion of lines) between the spool 67 and the flapper valve 68. Thus, when spool 67 moves slightly to the left as just described, the flapper valve 68 is also moved to the left against the force of the torque motor 60–1 until the force of the spool on the flapper valve is balanced by the force of the torque motor. This condition continues until the signal in the winding of the torque motor 60–1 terminates, at which time the flapper valve 68 moves (in the present example) to the left sufficiently to block or at least partially restrict nozzle 69L. When this occurs, the pressure in end chamber 66L increases and the spool 67 is returned to the right, until a balanced condition is obtained. The spool 67 is then in its centered position. This assumes no signal is being applied to the torque motor 60–1.

Reference is now made to limiter 80, the purpose of which is to limit the axial movement of the piston 74. Limiter 80 is shown to comprise a wedge member 81 having an upper flange portion, an intermediate portion, a tapered or wedge portion, and a tip portion. Piston 74 is provided with a transverse hole, enlarged on the side facing the wedge member 81, for receiving the intermediate, tapered and tip portions of the wedge member 81. In the absence of hydraulic pressure at input port 62, compression spring 82 forces the wedge member 81 downward, the tip of the wedge member 81 protruding from the opposite side of the piston 74 and entering a hole 83 provided in the housing. In this position, the piston 74 is locked against movement. This is the condition illustrated in FIG. 6. As already indicated, this condition exists only when there is no hydraulic pressure at input port 62.

When the unit is functioning, fluid pressure exists at port 62 and the wedge member 81 is forced upward to a position determined by the relationship between the fluid pressure and the compressive force of spring 82.

It is preferred that the position of wedge member 81, in the presence of fluid pressure, allow axial movement of piston 74 to a limited extent, such that the movement of the pilot's control linkage (of which pistons 74 and 74–2 are a part) caused by movement of the said pistons shall not exceed approximately 25–30% of the maximum movement available to the pilot.

When the piston 74 is moved to the left by the hydraulic actuator, in the example described above, a similar and corresponding action is taking place in the other hydraulic unit, but the current flow through the windings of the torque motor 60–2 is such that the torque motor 60–2 rotates in a direction to move flapper valve 68–2 to the left, whereby the piston 74–2 is moved to the right. Thus, the pistons 74 and 74–2 are moved simultaneously in opposite directions with respect to their housings 61–1 and 61–2 to extend the linkage.

When the direction of the turn of the helicopter about the roll axis is opposite to that assumed above, the action of the differential actuator unit of FIG. 6 will be to move the pistons 74 and 74–2 toward each other, thereby to contract the linkage.

FIG. 6 also indicates digrammatically the relationship of the differential hydraulic actuator 108 to the pilot's control system. The reference numeral 90 represents the pilot's cyclic stick (or direction pedals) connected through linkage to the lower boost, and thence through the piston 74, the bolted housings 61–1 and 61–2, and the piston 74–2 to an upper boost flight control mixing and swash plate. It should be understood that the terminology lower boost and upper boost, as normally employed in helicopter technology, refers to actuators and, more particularly, to hydraulic actuators which act as mechanical amplifiers for aiding the helicopter pilot in operating flight controls. Additionally, it should be understood that the terminology flight control mixing refers to the mechanism commonly employed in the helicopter field for mixing a plurality of flight controls such as, for example, roll and yaw controls or thrust and pitch attitude controls for application to the helicopter's rotary mechanisms during maneuvers of the helicopter.

When the pilot moves the cyclic stick 90, the entire differential hydraulic actuator is moved as a unitary part of the linkage, the pistons 74 and 74–2 being held in their centered positions in their respective piston chambers by the equal fluid pressure which is being applied to opposite faces of the pistons. It should be understood that there is a slight leakage of fluid into the ports 72L and 72R past the lands when the spool 67 is in its neutral position. This statement assumes that no rate-gyro signal is being applied to the torque motors 60–1 and 60–2. If a rate-gyro signal is being applied, the pistons 74 and 74–2 will be moved differentially within the linkage being moved by the pilot, and the pilot will override the linkage movement due to the automatic stabilization system without even being aware that he is performing an overriding action.

If a rate gyro signal is received at a time when the pilot is merely holding the cyclic stick 90, or during a "hands off" period, the pistons 74 and 74–2 will move differentially to extend or to contract the linkage without the pilot's cyclic stick 90 being moved at all. This is because the lower boost end of the piston 74 is fixed, as will be clear from the following: Assume that the rate of turn about the roll axis is such that the differential hydraulic actuator 108 acts to move the pistons 74 and 74–2 away from each other to extend the linkage. When fluid pressure is applied to the right face of piston 74 to move it to the left, as viewed in FIG. 6, the piston cannot move, being fixed at the lower boost end. As a result, the entire housing 61–1 and 61–2 moves to the right. At the same time, the piston 74–2 is being moved to the right. Thus, the linkage is extended by an amount equal to the sum of the displacements of the two pistons.

For effecting negative feedback to the servo amplifier 106, a mechanical linkage 190, shown merely diagrammatically in FIG. 6, is connected to the piston 74, adapted to move the wiper arm 191 of a potentiometer 92 in accordance with the movements of the piston 74. A similar potentiometer 92-2 is associated with the other piston 74-2 of the other unit. Potentiometer 92 is also shown in FIG. 5, the complete electrical connections between potentiometer 92 and the roll-axis servo amplifier 106R being shown in FIGS. 3, 4 and 5. It will be seen that the 400 c.p.s. current which is fed to the potentiometer 92 is taken from transformer T17 (FIG. 3) and that the negative feedback signal from the wiper arm is applied at point K to the input winding of transformer T6.

The insertion of the feedback signal at point K reduces the amplitude of the signal which would otherwise be applied to the windings of the torque motor 60-1, and the piston 74 therefore takes up an off-center position (to the left of its center position in the present example) determined by the applied net signal. When the signal developed by the roll rate gyro terminates, the feedback signal from the potentiometer 92 remains applied at point K since the wiper arm 191 is still off center. This feedback signal is amplified by the servo amplifier 106R, is demodulated and applied to the winding of the torque motor 60-1. This signal causes the motor to turn in a direction to return the piston 74 to its centered position, at which time the signal from the potentiometer 92 becomes zero.

It was stated hereinbefore that the spool 67 actually comprises two separate spools 67L and 67R. These spools have between them a compression spring 167 which tends to spread the spools apart, but when fluid pressure is present in the end chambers 66L and 66R, the spools are held together in abutting relationship. However, when there is a failure of hydraulic pressure, the spring 167 separates the two spools. This unblocks both of the ports 72L and 72R and permits fluid to pass from one side of the piston face to the other through the ports 72L and 72R, thereby allowing the piston 74 to center itself.

In accordance with the present invention, failure of one of the two dual stabilization units to function is sensed and the signal thus developed is used to increase the gain of the remaining unit. In the particular system shown and now being described, failure of hydraulic pressure in unit 1 is sensed by a pressure switch 120-1 shown diagrammatically in FIG. 5, while failure of pressure in unit 2 is sensed by pressure switch 120-2. It will be recalled that, upon failure of hydraulic pressure in one unit, a gain-control circuit 105 of the other unit is modified to step up the gain to compensate for the failure. The way this is done in the roll-axis channel will now be described.

Referring to FIG. 5, when fluid pressure is present in the aircraft's two main hydraulic pressure systems, the switch arms of pressure switches 120-2 and 120-1 are in the depressed position. The depressed arm of switch 120-2 connects the lower contact to ground and completes a circuit from a source of D-C voltage (FIG. 5) through the coil of the relay RY-1 (FIG. 3) as hereinafter described. When D-C voltage is supplied, the coil of the relay RY-1 is energized and the switch arms are pulled down to their lower contacts. This connects resistor r-1 to ground. Resistor r-1 is one of the two resistors r-1 and r-2 of equal value which, when the switch arm is in its upper position, are connected in parallel between the output of the modulator 104R and the input to transformer T6 of the roll-axis servo amplifier 106R. With resistor r-1 connected to ground, the current through the input winding of transformer T6 is reduced to about one-half its full value and the strength of the currents delivered by the demodulator 107R to the windings of the torque motor 60-1 are likewise reduced. This is the condition which exists when both units of the dual-unit system are functioning.

When there is a failure of fluid pressure in the aircraft's main hydraulic system associated with unit 2, the switch arm of pressure switch 120-2 rises, breaking the lower contact, and opening the circuit through winding of the relay RY-1. The switch arms of the gain-control unit 105R then rise to their upper positions, as viewed in FIG. 3, and the two resistors r-1 and r-2 are connected in parallel between the output of the demodulator 102R and the input to servo amplifier 106R. The current through the input winding of transformer T6 is then substantially doubled and the magnitudes of the currents delivered by demodulator 107R to the windings of the torque motor 60-1 are likewise increased. Thus, the piston 74 associated with the operative unit is moved a greater distance, within however the limits imposed by the limiter 80. The other piston 74-2 associated with the disabled unit, is locked in position by the wedge member 81-2 which, in the absence of hydraulic pressure, is now depressed by the compression spring 82-2 into the locking position shown in FIG. 6.

Failure of hydraulic pressure in one of the two stabilization units may be due to a failure in one of the two main hydraulic systems of the aircraft, or to a failure in the electrical systems. A protective relay RY-2 (FIG. 3) is provided, the winding of which is fed rectified current from a full-wave rectifier connected between the 400 c.p.s. lead and ground. So long as relay RY-2 remains energized, the switch arm is held down to maintain closed a direct-current path from the direct-current source (FIG. 5) to the winding of a solenoid shut-off valve 95 (FIG. 5) which controls the application of fluid pressure from one of the aircraft's main hydraulic pressure systems into the stabilization unit 1. So long as direct-current flows through the winding of the solenoid shut-off valve 95, the hydraulic pressure line is maintained open.

Failure of either A-C or D-C electrical power in unit 2 will de-energize control relay RY-1 (FIG. 3). That is, when the depressed arm of the switch 120-2 connects the lower contact to ground, it connects one terminal of the coil of relay RY-1 to ground through the terminal G' of the terminal board of the S.A.S. control box No. 1 (see FIG. 4). The other terminal of the coil of the relay RY-1 is connected through terminal F' of the terminal board of the S.A.S. control box No. 1 (see FIG. 4) to the terminal E' of the terminal board of the S.A.S. control box No. 2 (see FIG. 5). As is set forth hereinabove, the S.A.S. units are similar dual units. Accordingly, the circuitry of the S.A.S. control box No. 2 has not been shown to eliminate confusion and the duplication of FIGS. 2, 3, and a portion of FIG. 4.

Since the units are similar dual units, the connection of the non-grounded terminal of the coil of relay RY-1 through the terminal E' of the terminal board of S.A.S. control box No. 2 may be understood by reference to the terminal board of the S.A.S. control box No. 1. That is, terminal E' of the S.A.S. control box No. 1 corresponds with the terminal E' of the terminal board of the S.A.S. control box No. 2. Accordingly, it may be clearly understood by reference to terminal E' of the terminal board of the S.A.S. control box No. 1 that the non-grounded terminal of the coil of relay RY-1 is connected to a fixed contact of a relay corresponding to relay RY-2 (see FIG. 3). Additionally, since the terminal E' of the terminal board of S.A.S. control box No. 1 has a lead therefrom which is connected to a terminal of a shut off valve 95 through terminal D' of the terminal board of S.A.S. control box No. 1, it can be clearly understood that the non-grounded terminal of the coil of relay RY-1 is also connected through the terminal E' of the terminal board of the S.A.S. control box No. 2 and through the terminal D' thereof to a shutoff valve 95-2 (see FIG. 5).

As may be seen by reference to FIG. 3, the movable contact of the relay RY-2 is connected through terminal A' of the terminal board of the S.A.S. control box No. 1 to a S.A.S control switch, which is connected to a 28 volt D-C power supply (see FIG. 5). Accordingly, it can be readily understood that the movable contact of the relay in the S.A.S. control box No. 2 that corresponds to the relay RY–2 of FIG. 3 is connected through the terminal A' of the terminal board of the S.A.S. control box No. 2 (see FIG. 5) to the S.A.S. control switch (see FIG. 4). The S.A.S. control switch is connected to a 28 volt D-C power supply (see FIG. 5).

Figure 4:
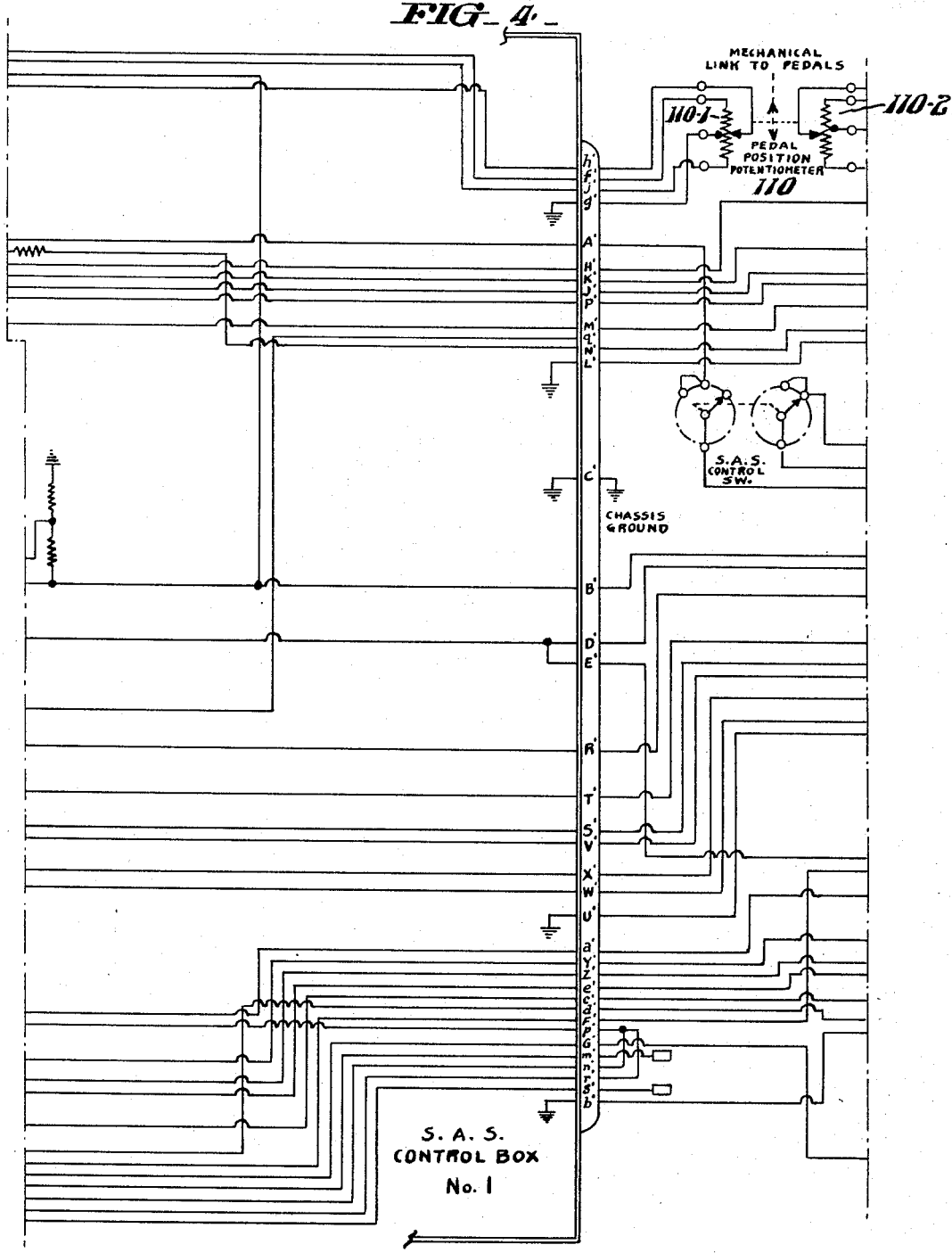

Additionally, the relay RY–1 (see FIG. 3) and the corresponding relay of the S.A.S. control box No. 2 are operated by a 26 volt A-C power source (see FIG. 5) through their respective terminals B' of the terminal boards of the S.A.S. control boxes No. 1 and No. 2 (see FIGS. 4 and 5).

From the foregoing, it can be clearly understood that the above-described interconnecting circuitry is capable of sensing hydraulic, or A-C, or D-C electrical failure in either of the two units. For example, in the circuit including the relay RY–1, hydraulic failure is sensed by the main pressure switch 120–2. Failure of alternating current from the 26 volt A-C power supply (see FIG. 5) is sensed since the coil of the alternating current relay in the S.A.S. control box No. 2 that corresponds with the alternating current relay RY–2 is not energized and the movable contact thereof opens the D-C path to the coil of relay RY–1. Failure of D-C potential from the 28 volt D-C power source (see FIG. 5) is sensed since the coil of relay RY–1 is not energized.

When the coil of the relay RY–1 is de-energized by failure of either A-C or D-C power in Unit 2, the switch arms operated by the coil of relay RY–1 are caused to move to their UP positions. Thus, the second resistor (resistor r-1 in the case of the roll-axis channel) is connected in parallel with the first resistor (r-2 in the roll-axis channel) thereby substantially doubling the flow of current through the input winding of transformer T6 of the servo amplifier. The effect is to double the motion of the hydraulic-actuator piston 74, thereby compensating for the failure of the stabilization unit 2.

This completes what is believed to be an understandable description of the operation of the roll-axis stabilization channel 100R.

The pitch-axis channel 100P is substantially similar to the roll-axis channel and need not be separately described.

The yaw-axis channel 100Y is also similar in many respects to the roll-axis and pitch-axis channels, and accordingly it will only be necessary to describe those features of the yaw-axis channel which ahe different from those of the roll-axis channel already described.

Figure 2:
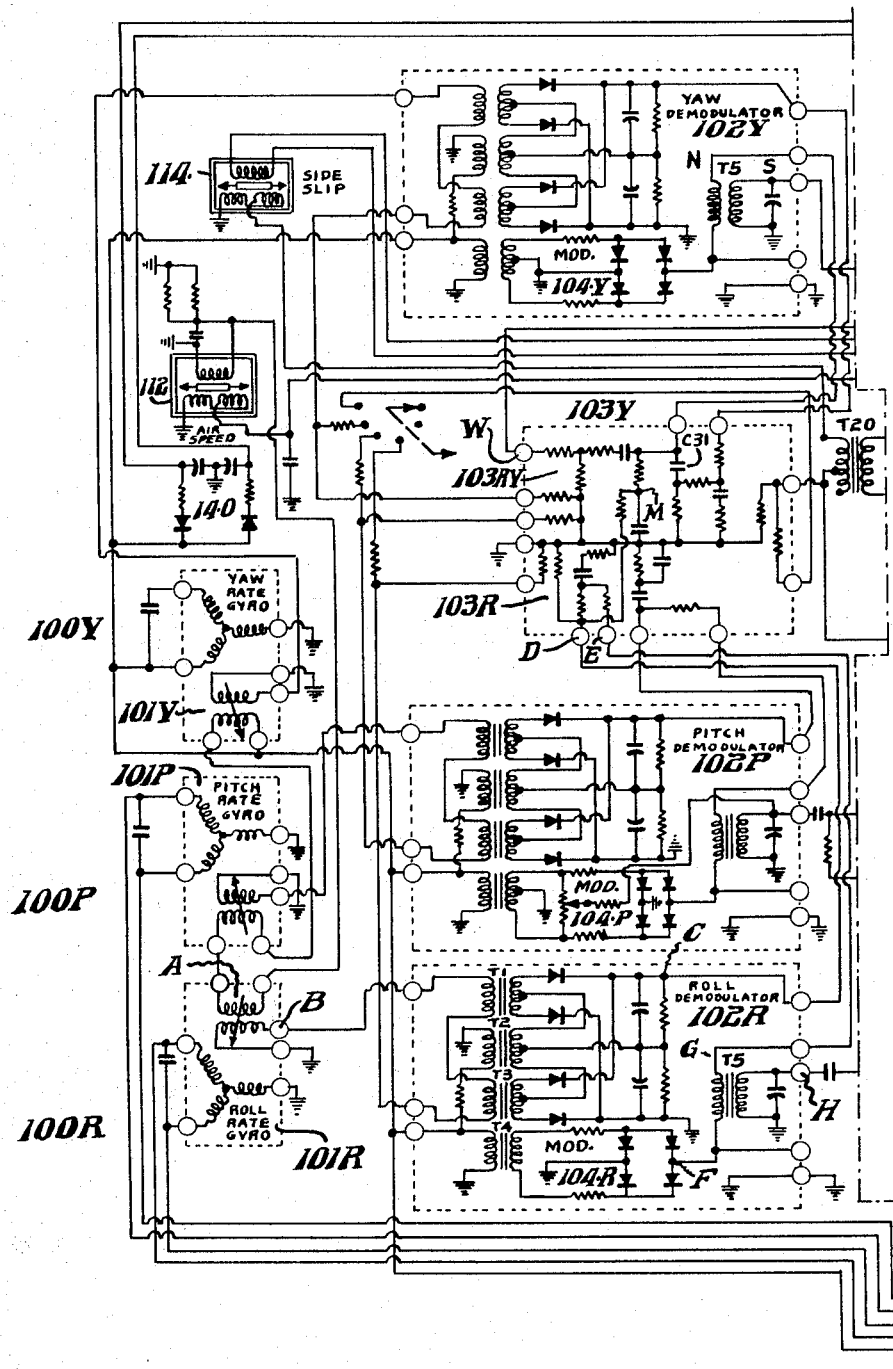

As has been indicated previously herein, a signal is taken from the demodulator 102R of the roll-axis channel and applied through a lag network 103RY to the input of the modulator 104Y of the yaw-axis channel to cancel out the initially applied signals which pass through the wash-out network 103Y during the time-constant period. The specific connection in FIG. 2 is from point C of the roll-axis demodulator 102R to point M of the network 103RY and then to point N of the yaw-axis modulator 104Y. The purpose of the signal path just described is to cancel out any yaw rate signals during turn entry so that turns may be well coordinated. Since this cancellation signal from the roll-axis gyro lasts only during entry into the turn, the yaw rate gyro signal is fed to the servo amplifier 106Y through a "wash-out" network 103Y. This network removes any steady state yaw rate gyro signal. The blocking capacitor in the wash-out filter is identified in FIG. 2 as C31. This may, for example, be a 40 microfarad capacitor.

It has also been indicated hereinbefore in connection with the description of the block diagram of FIG. 1 that a sideslip signal is detected by a differential pressure transducer fed by a pair of static ports symmetrically mounted on the nose of the helicopter, and that for optimum stability at all airspeeds, the gain of the sideslip transducer is programmed as a function of air speed so that precise coordination is obtained at all airspeeds between 60 knots and maximum airspeed. The details of the sideslip transducer circuit will now be described.

The sideslip transducer itself is a known commercial pressure transducer which may, for example, be Model S–40RP±0.5–D manufactured by Ultradyne, Inc. of Albuquerque, N. Mex. The sideslip transducer 114 is represented diagrammatically in the upper left-hand portion of FIG. 2 as a device having an input winding, a pair of differentially connected output windings, and a movable slug. A 400 c.p.s. current is passed through the upper winding and a voltage is induced in the lower windings which is a function of the position of the slug. The position of the slug is determined by the air pressure applied to the differential static pressure ports shown in FIG. 1. The signal voltage developed in the lower windings is applied to the input winding of sideslip transformer T20. The output winding of transformer T20 is connected to the input transformer RT6 of the yaw-axis servo amplifier 106Y through the gain-control network 105Y. The two resistors of equal value which determine the gain of the gain-control network 105Y are identified in FIG. 3 as R38 and R68. Those correspond to resistors r-1 and r-2 of 105R and are controlled in a similar manner by relay RY–1. It is to be noted that the output winding of the sideslip transformer T20 (FIG. 2) is connected in series between the output of the yaw-axis modulator 104Y (point S, FIG. 2) and the input to the gain-control network 105Y (point T, FIG. 3). Thus, the signal developed by the sideslip transducer adds to or opposes the yaw rate gyro signal according to the relative phases of the two signals as determined by the direction of the rate of turn of the yaw rate gyro.

As has already been indicated, the gain of the airslip transducer is programmed or varied as a function of air speed. The circuit details by which this is accomplished will now be described.

The air speed transducer 112 is shown diagrammatically in the upper left-hand portion of FIG. 2 just below the sideslip transducer 114. Like the sideslip transducer 114, the air speed transducer 112 is a commercial item and may the same model of pressure transducer as used for sideslip. A 400 c.p.s. reference current is passed through the upper winding of the air speed transducer 112 and a voltage is induced in the differentially-wound lower windings, which is a function of the position of the slug, as determined by the air speed. The voltage developed in the lower windings of the air-speed transducer 112 is applied to the input winding of transformer AT6 of the air speed amplifier 115A (FIG. 3). The output of the air speed amplifier 115A is applied to the air speed demodulator 115D. A push-pull D-C output is obtained which is applied in series across the lower windings of a pair of airspeed saturating transformers 115T. Thus, the degree of saturation of the cores of transformers 115T is a function of air speed. A 400 c.p.s. reference signal is applied differentially to the lower windings of the air speed transformers 115T. The extent to which this refer ence signal is transferred inductively to the upper windings is dependent on the degree of saturation of the cores of the transformers 115T as determined by the air speed signal. Thus, the strength of the 400 c.p.s. current in the upper windings of transformers 115T is a function of air speed. This is the 400 c.p.s. current which is applied through a stepdown transformer T19 to the upper winding of the sideslip transducer 114. Thus, the combination of air speed amplifier 115A, demodulator 115D and saturating transformers 115T function as a variable-gain amplifier 115 for controlling the output of the sideslip transducer 114 as a function of air speed.

As indicated previously herein, a fourth signal is also applied to the yaw-axis channel. This is a rudder pedal pick-off signal used to cancel the yaw rate gyro signal in turns. This gives precise control in hover. As shown diagrammatically in FIG. 4, when the rudder pedal is moved by the pilot, a pair of wiper arms, one associated with each of the dual units of the stabilization system, is moved along its respective potentiometers 110–1 and 110–2. Direct-current is applied to opposite ends of the potentiometer 110–1 from a half-wave rectifier circuit 140 (shown in FIG. 2 just below the air speed transducer 112) and the voltage picked off by the wiper of potentiometer 110–1 is applied to the frequency-selective network 103Y at point W.

This completes the detailed description of Unit 1 of the two dual units of the automatic stabilization system. The other stabilization unit (Unit 2) is merely indicated as a block in FIG. 5 of the drawing. It is identical to Unit 1 and no detailed description thereof is necessary. The two stabilization units are cross-connected as shown and described so that a failure in one is detected and the other unit then modified to deliver double the actuator motion. Corresponding terminals on each of the two stabilization units (Unit 1 and Unit 2) are identified by the same reference letters.

Having described my invention, I claim:

1. In an aircraft having a control system; a pair of substantially identical automatic stabilization units, each of said units comprising: a plurality of gyro means, one for each axis, for sensing the rate and direction of turn of the aircraft about each of the roll, pitch and yaw axes and for developing for each axis an electrical signal indicative of the rate and direction of turn about that axis; a plurality of electrical circuit channels, one for each axis, coupled to said gyro means for amplifying and detecting said developed signal; separate actuator means, one for each axis, between each said electrical circuit channels and the aircraft's control system and responsive to the detected signal for that channel for so moving the aircraft's control system as to stabilize said craft about the particular axis; gain-control means in each of said electrical circuit channels for controlling said detected signal to which said actuator means are responsive; electrical means interconnecting said pair of stabilization units for sensing a failure in one of said units and for modifying the gain-control means of each channel of the other unit to increase the channel gain thereof and to increase the motion of the actuator means associated therewith, whereby the loss of motion of the actuator means of the failed unit is compensated by the increased motion of the actuator means of the operating unit.

2. Apparatus as claimed in claim 1 characterized in that said means for sensing a failure in either one of said stabilization units comprises: a pair of electrical circuits interconnecting said two stabilization units, each connectable to a source of direct-current power, a pair of gain-control relays, one in each unit, each having a winding in series in one of said interconnecting circuits; a pair of protective relays, one in each unit, each having a winding connectable to a source of alternating current power and having contacts in series in one of said interconnecting circuits; a pair of main pressure switches, one in each stabilization unit, for sensing a failure of pressure in the main hydraulic systems of the aircraft, each of said main pressure switches having contacts in series in one of said interconnecting circuits; a solenoid-operable hydraulic shut-off valve in each of said stabilization units, each of said shut-off valves being connected in the hydraulic system of one of said units between the main pressure switch and the actuator means of that unit, said solenoid having a winding connectable to the same source of direct-current power as is connectable to the winding of said gain-control relay of the other unit.

3. Apparatus as claimed in claim 2 characterized in that each of said gain-control relays, one for each stabilization unit, includes a plurality of switches, one switch for each axis channel, for modifying the gain-control means of that particular channel according to the sensed condition of the other unit.

4. Apparatus as claimed in claim 3 further characterized by the provision of sideslip pressure-transducer means for sensing sideslip of the aircraft and for developing an electrical signal which is a function of said sideslip, and means for applying said sideslip signal to said yaw axis in series with said yaw-axis gyro-developed signal.

5. Apparatus as claimed in claim 4 further characterized in the provision of an air speed pressure-transducer for developing an electrical signal which is a function of the air speed of said aircraft, and by the provision of variable-gain means coupled between said air speed transducer and said sideslip transducer for controlling the gain of said sideslip transducer as a function of said air speed signal.

6. Apparatus as claimed in claim 5 further characterized by the provision of a potentiometer mechanically connected to the rudder pedal control of said aircraft and electrically coupled to said yaw-axis channel for applying a signal to said yaw-axis channel to cancel the yaw-axis gyro-developed signal during yaw turns.

7. Apparatus as claimed in claim 6 characterized in that each of said plurality of electrical circuit channels includes a frequency-selective shaping network.

8. Apparatus as claimed in claim 7 further characterized in that the frequency-selective network of said yaw-axis channel includes a low-frequency blocking capacitor.

9. Apparatus as claimed in claim 8 further characterized in that a frequency-selective network is interconnected between said roll-axis channel and said yaw-axis channel for applying a roll-axis developed signal to said frequency-selective circuit of said yaw-axis channel.

10. In an aircraft; a control system; a pair of automatic stabilization units, each of said units including first electrical means for supplying a signal indicating the rate and direction of turn of the aircraft about its roll axis; second electrical means for supplying a signal indicating the rate and direction of turn of the aircraft about its pitch axis; third electrical means for supplying a signal indicating rate and direction of turn of the aircraft about its yaw axis; a first actuator mechanism adapted for actuating the control system in response to said signal from said first electrical means so as to stabilize the aircraft about its roll axis; a second actuator mechanism adapted for actuating the control system in response to said signal from said second electrical means so as to stabilize the aircraft about its pitch axis; a third actuator mechanism adapted for actuating the control system in response to said signal from said third electrical means so as to stabilize the aircraft about its yaw axis; electrical means interconnecting said pair of stabilization units for sensing a failure in one of said units and for modifying said first, second, and third electrical means in the other of said units to increase said signals therefrom for increasing the response of said first, second, and third actuator mechanisms associated therewith, whereby the loss of motion of the first, second, and third actuator mechanisms of the failed unit is compensated by the increased motion of the first, second, and third actuator mechanisms of the operating unit.

11. An apparatus according to claim 10 in which fourth electrical means are provided for supplying a signal in accordance with sideslip of the aircraft for modifying the signal from said third electrical means.

12. An apparatus according to claim 11 in which the signal from said fourth electrical means is modified in accordance with the airspeed of the aircraft.

13. In an aircraft having a control system, a pair of automatic stabilization units, each of said units including first electrical means for supplying a signal indicating the rate and direction of turn of the aircraft about a reference axis, actuator mechanism adapted for actuating control system in response to said signal from said first electrical means so as to stabilize the aircraft about its reference axis, second electrical means interconnecting said pair of stabilization units for sensing a failure in one of said units and for modifying said first electrical means in the other of said units to increase said signal therefrom for increasing the actuation of said actuator mechanism associated therewith, whereby the loss of motion of the actuator mechanism in the failed unit is compensated by the increased motion of the actuator mechanism of the operating unit.

14. An apparatus according to claim 13 in which additional electrical means are provided for supplying a signal in accordance with sideslip of the aircraft for modifying the signal from said first electrical means.

15. An apparatus according to claim 14 in which further electrical means are provided to modify the signal from said additional electrical means in accordance with the airspeed of the aircraft.

16. In an aircraft having a control system, a pair of automatic stabilization units, each of said units including first electrical means for supplying a signal indicating a change in a flight condition of the aircraft from a normal flight condition, actuator mechanism adapted for actuating the control system in response to said signal from said first electrical means so as to stabilize the aircraft about its normal condition, second electrical means interconnecting said pair of stabilization units for sensing a failure in one of said units and for modifying said first electrical means in the other of said units to increase said signal therefrom for increasing the actuation of said actuator mechanism associated therewith, whereby the loss of motion of the actuator mechanism in the failed unit is compensated by the increased motion of the actuator mechanism of the operating unit.

17. In a dirigible craft having a control system, a pair of automatic stabilization units, each of said units including first means for supplying a signal in response to the rate and direction of change in a first flight condition from normal and a change in a second flight condition from a normal condition, actuator mechanism adapted for actuating the control system in response to said signal from said first means so as to stabilize the aircraft with respect to said normal conditions, second means interconnecting said pair of stabilization units for sensing a failure in one of said units and for modifying said first means in the other of said units to increase said signal therefrom for increasing the actuation of said actuator mechanism associated therewith, whereby the loss of motion of the actuator mechanism in the failed unit is compensated by the increased motion of the actuator mechanism of the operating unit.

18. In an aircraft having a control system, a pair of automatic stabilization units, each of said units including first electrical means for supplying a signal indicating the rate and direction of turn of the aircraft about a reference axis, actuator mechanism adapted for actuating the control system in response to said signal from said first electrical means so as to stabilize the aircraft about its reference axis, second electrical means interconnecting said pair of stabilization units for sensing an electrical failure in one of said units and for modifying said first electrical means in the other of said units to increase said signal therefrom for increasing the actuation of said actuator mechanism associated therewith, and means controlled by the second electrical means rendering the actuator means ineffective in the failed unit.

References Cited

UNITED STATES PATENTS 2,733,878   2/1956   Ciscel _____ 244—78

FERGUS S. MIDDLETON, *Primary Examiner.*